(12) United States Patent
Chien

(10) Patent No.: US 9,857,587 B2
(45) Date of Patent: Jan. 2, 2018

(54) HEAD-UP DISPLAY DEVICE

(71) Applicants: LITE-ON ELECTRONICS (GUANGZHOU) LIMITED, Guangzhou (CN); LITE-ON TECHNOLOGY CORPORATION, Taipei (TW)

(72) Inventor: Hung-Chang Chien, Hsinchu County (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 30 days.

(21) Appl. No.: 15/084,561

(22) Filed: Mar. 30, 2016

(65) Prior Publication Data

US 2016/0299343 A1 Oct. 13, 2016

Related U.S. Application Data

(60) Provisional application No. 62/145,039, filed on Apr. 9, 2015.

(51) Int. Cl.
| | | |
|---|---|---|
| *G02F 1/153* | (2006.01) | |
| *G02B 27/14* | (2006.01) | |
| *G02B 27/01* | (2006.01) | |

(52) U.S. Cl.
CPC .. *G02B 27/0149* (2013.01); *G02B 2027/0154* (2013.01)

(58) Field of Classification Search
CPC ............ A61B 1/00096; A61B 1/00172; A61B 1/00177; A61B 1/0125; A61B 1/043; A61B 5/0062; A61B 5/0066; A61B 5/0068; A61B 5/0071; A61B 5/0084; A61B 3/135; G02B 21/0048; G02B 23/24; G02B 26/0841; G02B 2027/0154; G02B 27/0149; G02B 7/36
USPC ....... 359/237, 242, 267, 277, 290–292, 315, 359/321, 322, 619–633
See application file for complete search history.

(56) References Cited

U.S. PATENT DOCUMENTS 8,077,396 B2    12/2011   Croy et al.

FOREIGN PATENT DOCUMENTS

| CN | 204065555 U | 12/2014 |
| JP | 2004333741 A | 11/2004 |
| TW | M480074 U | 6/2014 |

*Primary Examiner* — Brandi Thomas
(74) *Attorney, Agent, or Firm* — Li & Cai Intellectual Property (USA) Office

(57) ABSTRACT

The instant disclosure provides a head-up display device including an accommodating housing, a projection panel assembly, a protective cover, a transmission means, and a switching means. The transmission means includes a first transmission unit and a second transmission unit. The switching means is switched to drive the first transmission unit or the second transmission unit. Thereby, the first transmission unit is driven by the switching means to move the protective cover, or the second transmission unit is driven by the switching means to move the projection panel assembly relative to the accommodating housing.

16 Claims, 19 Drawing Sheets

HEAD-UP DISPLAY DEVICE

BACKGROUND

1. Technical Field

The instant disclosure relates to a head-up display device, in particular, to a head-up device which drives the projection panel assembly or the protective cover by switching a switching means.

2. Description of Related Art

Head-up displays (HUD) are devices for projecting instrument panel information on the windshield. Compared to the conventional instrument panels, the driver does not need to lower his head for reading important information and is able to read the information related to the instrument panels while looking at the road.

Currently, head-up displays including slidable projection panel assembly are presented. These products display the vehicle information by the projection panel assembly which slides upwardly, and when not in use, the projection panel assembly slides downward to enter the housing of the head-up display. However, the head-up displays in the prior art do not include protective covers and hence, the projection panel assembly and the components therein may be exposed under sunlight or covered by dust, thereby causing the damage of the components.

There are few products including a protective cover to protect the components therein. A motor is needed for controlling the opening and closing of the protective cover and hence, the manufacturing cost and the manufacturing complexity of the product is increased.

In addition, regarding the products in which the opening and closing of the projection panel assembly and the protective cover is controlled by a set of a motor and a lead screw, the manufacturing cost of the lead screw is relatively high and may cause the head-up display to have a longer overall length.

Therefore, there is a need of providing a head-up display to overcome the above disadvantages.

SUMMARY

An exemplary embodiment of the present disclosure provides a head-up display device comprising a projection panel assembly, a protective cover, a transmission means and a switching means. The protective cover shields or exposes the projection panel assembly. The transmission means comprises a first transmission unit arranged on the protective cover and a second transmission unit connected to the projection panel assembly. The switching means comprises a first driving unit, a second driving unit driven by the first driving unit and a pivotally-rotating unit, in which the second driving unit is driven by the first driving unit and the pivotally-rotating unit to move between a first position and a second position. When the second driving unit is positioned at the first position, the second driving unit drives the first transmission unit, and the first transmission unit drives the protective cover to move between a closed position and an open position. When the second driving unit is positioned at the second position, the second driving unit drives the second transmission unit, and the second transmission unit drives the projection panel assembly to move between a storage position and a display position.

Another exemplary embodiment of the present disclosure provides a head-up display device, comprising an accommodating housing, a projection panel assembly, a protective cover, a transmission means, and a switching means. The transmission means comprises a first transmission unit and a second transmission unit. The switching means is switched to drive the first transmission unit or the second transmission unit. The first transmission unit is driven by the switching means to move the protective cover relative to the accommodating housing. The second transmission unit is driven by the switching means to move the projection panel assembly relative to the accommodating housing.

The advantages of the instant disclosure reside in that the head-up display device involves driving the first transmission unit by the switching means thereby driving the protective cover to move relative to the accommodating housing, or driving the second transmission unit by the switching means thereby driving the projection panel assembly to move relative to the accommodating housing. The structure of the switching means is not complicated and the switching method using the same is easy since the function of driving the protective cover and the projection panel assembly may be achieved by only one set of driving means.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
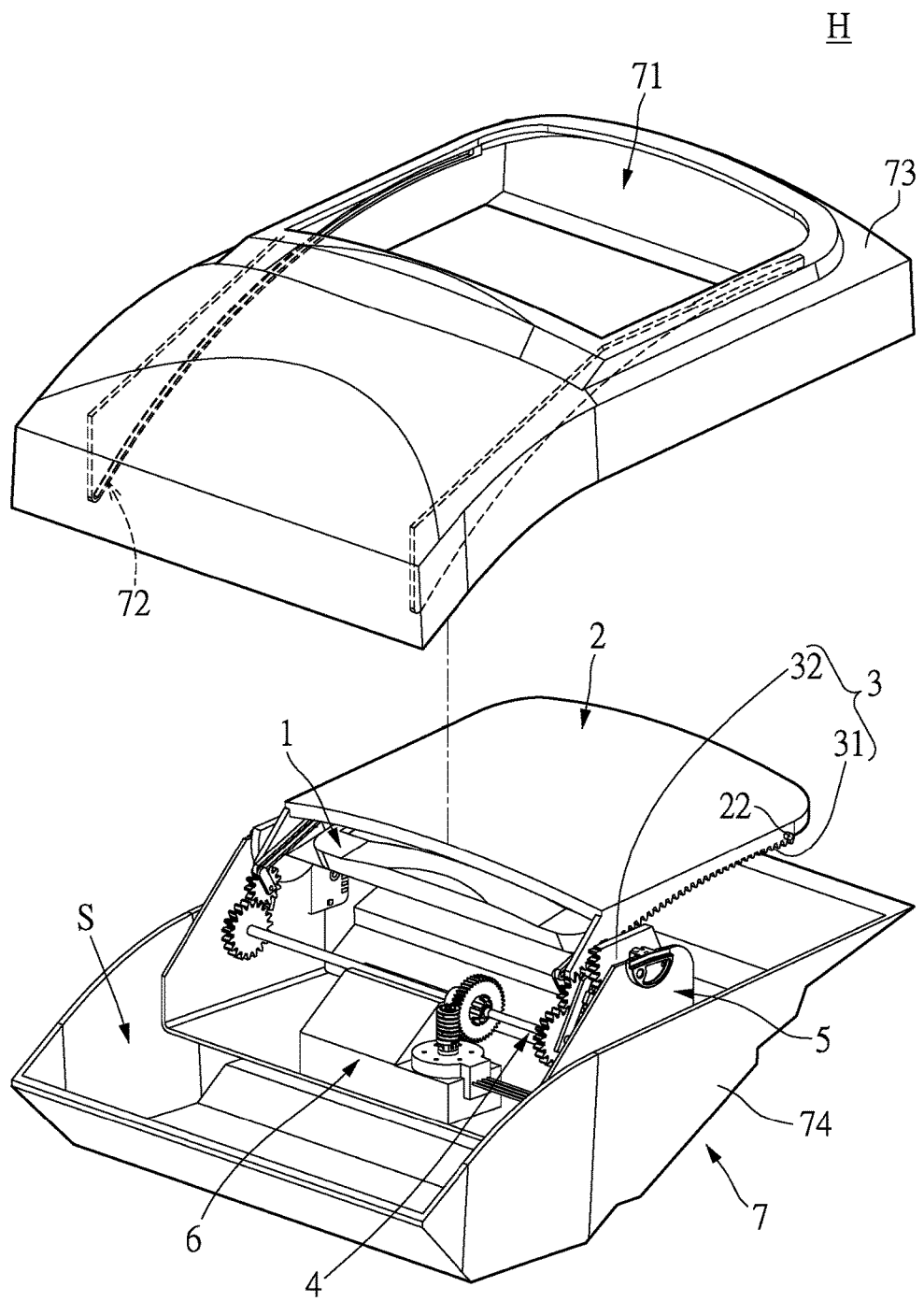
FIG. 1 is a partial three-dimensional exploded view of the head-up display device of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

Figure 2:
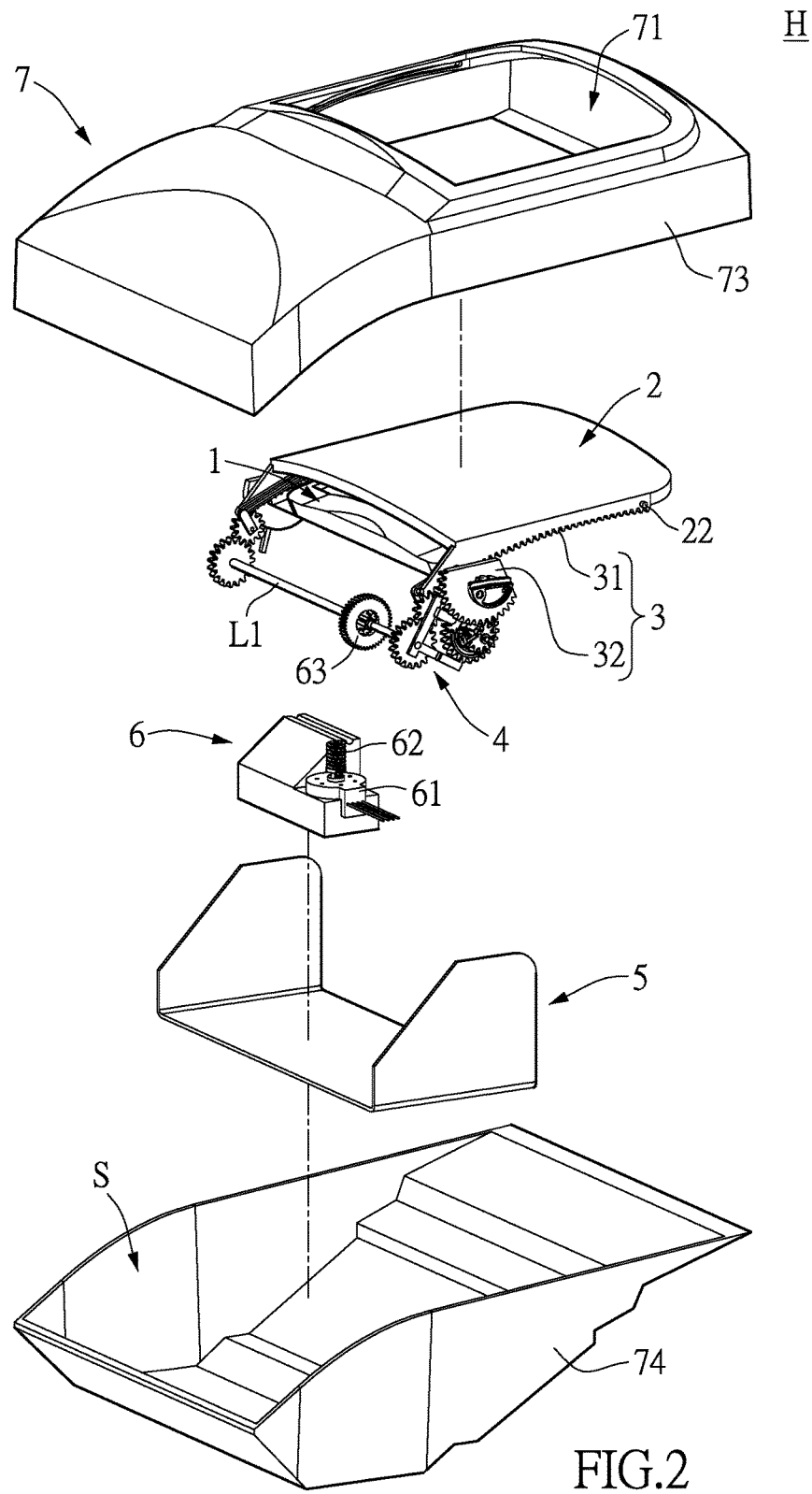
FIG. 2 is another three-dimensional exploded view of the head-up display device of the instant disclosure.
Figure 3:
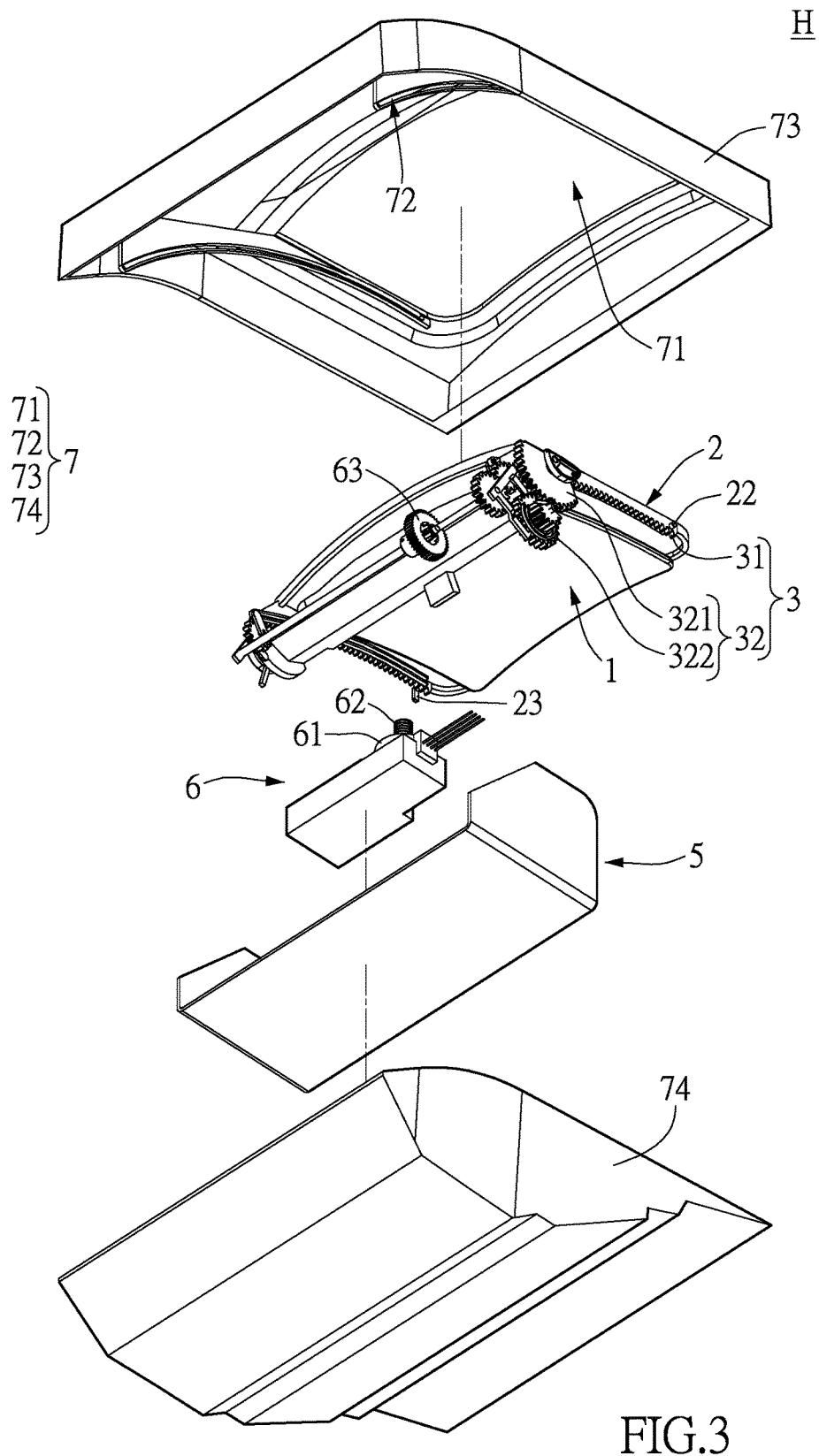
FIG. 3 is yet another three-dimensional exploded view of the head-up display device of the instant disclosure.

First, please refer FIG. 1 to FIG. 3, the embodiment of the instant disclosure provides a head-up display device H comprising a projection panel assembly 1, a protective cover 2, a transmission means 3, a switching means 4, a base 5, a driving means 6 and an accommodating housing 7. The projection panel assembly 1, the transmission means 3, the switching means 4, the base 5 and the driving means 6 are accommodated in a receiving space S of the accommodating housing 7. The accommodating housing 7 may be a part of the dashboard housing or may be combined with the dashboard housing. The projection panel assembly 1 and the protective cover 2 may move relative to the accommodating housing 7. In addition, the accommodating housing 7 further comprises an opening 71 connected to the receiving space S, and the protective cover 2 is moved by the transmission means 3 and the switching means 4 for allowing the projection panel assembly 1 to slide upwardly through the opening 71 from the accommodating housing 7.

Figure 4:
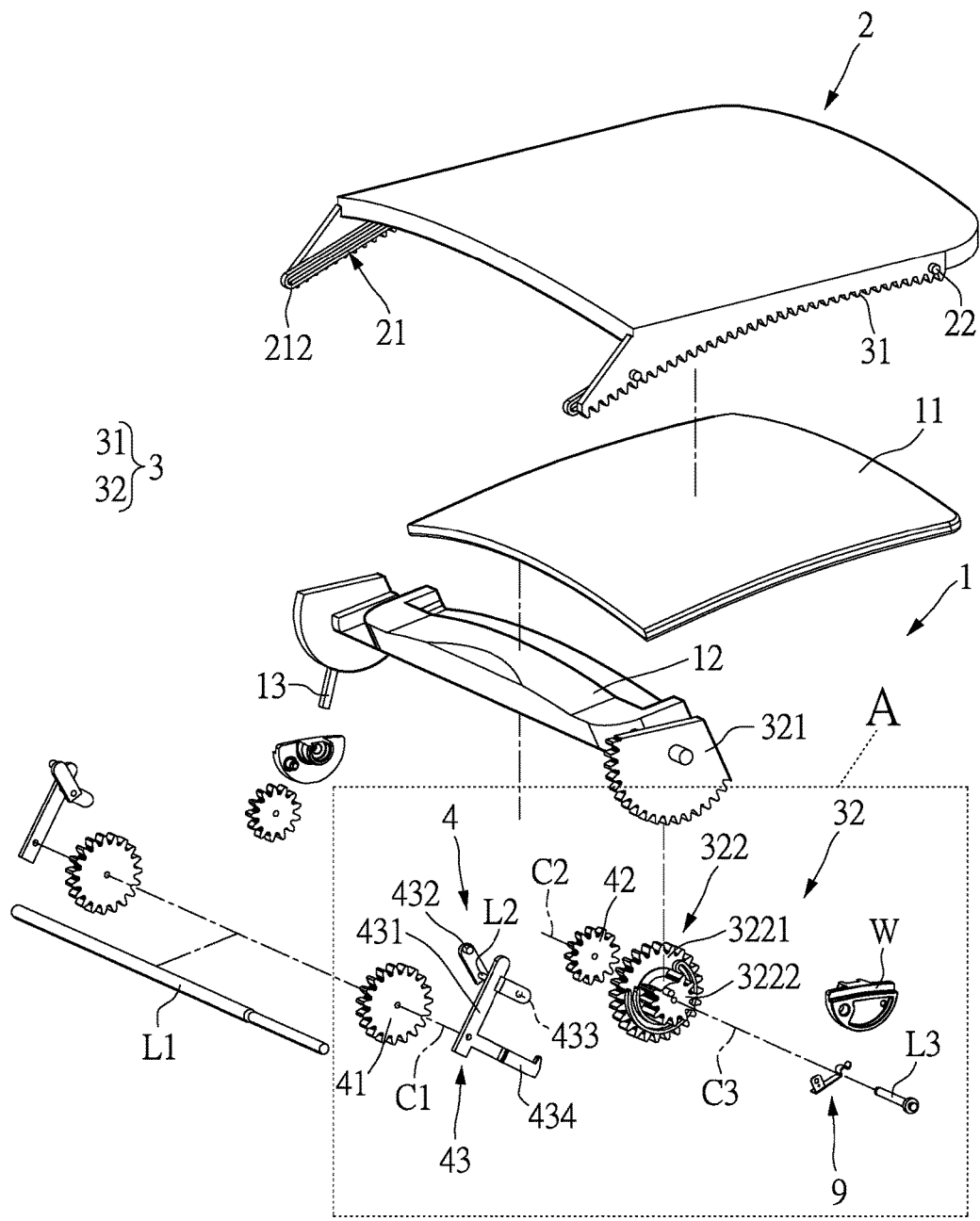
FIG. 4 is one of the partial three-dimensional exploded views of the head-up display device of the instant disclosure.
Figure 5:
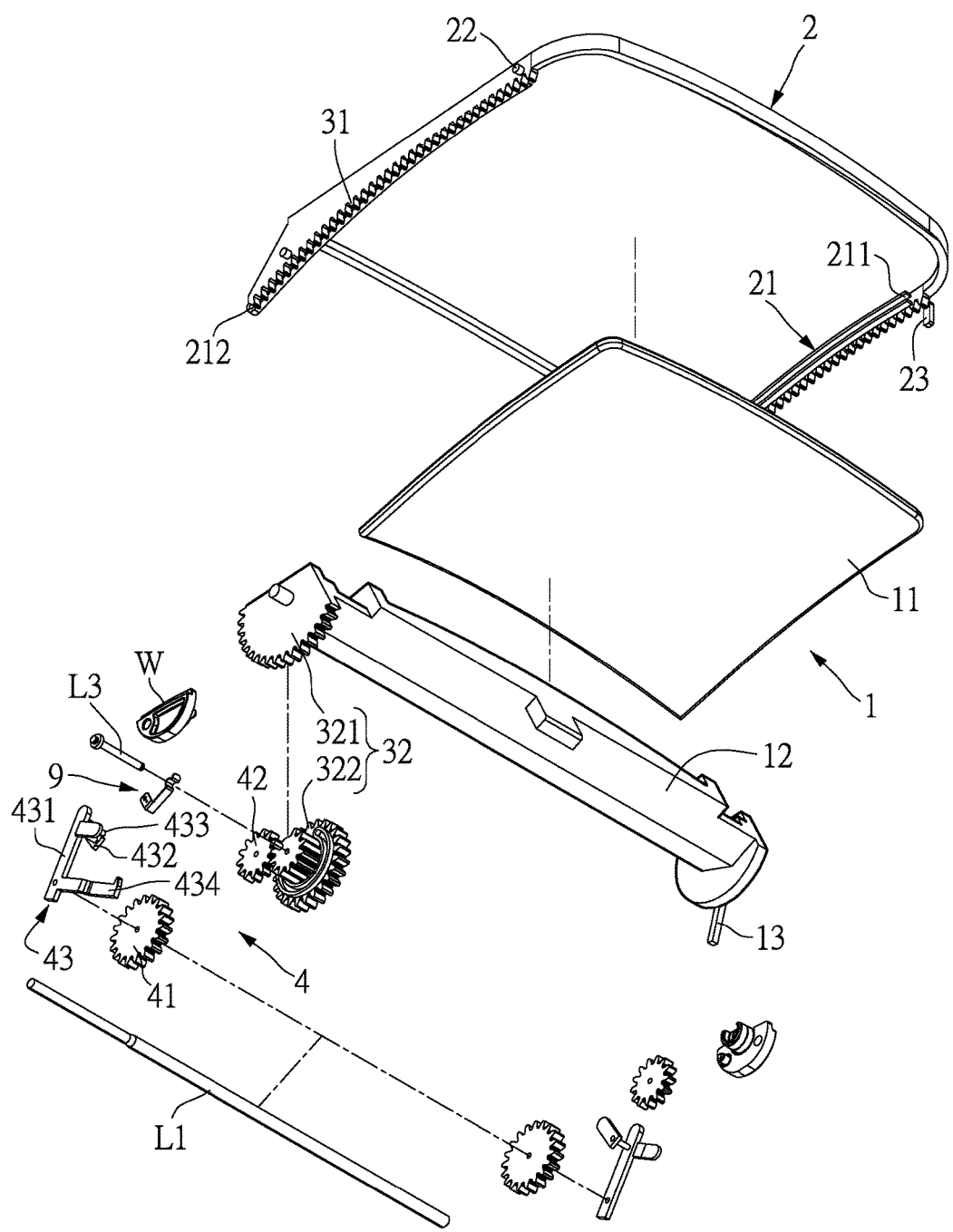
FIG. 5 is content of FIG. 4 shown in another viewpoint.

For instance, the accommodating housing 7 of the embodiment of the instant disclosure comprises a first casing 73 having the opening 71 and a second casing 74 arranged corresponding to the first casing 73. However, it is worthwhile to mention that although the accommodating housing 7 is a two-piece element (comprising the first casing 73 and the second casing 74) in the present embodiment, the accommodating housing 7 may be a one-piece element or an element constituted by a plurality of components according to actual need. The base 5 is arranged on the second casing 74, the driving means 6 is arranged on the base 5 and comprises a driving motor 61 and a driving wheel 62 driven by the driving motor 61. The driving wheel 62 is connected (or geared) to the switching means 4 for driving the switching means 4 and hence, the switching means 4 may be switched to drive the first transmission unit 31 or the second transmission unit 32 of the transmission means 3 during the operation. Therefore, the first transmission unit 31 is driven by the switching means 4 and drives the protective cover 2 to move relative to the accommodating housing 7, the second transmission unit 32 is driven by the switching means 4 and drives the projection panel assembly 1 to move relative to the accommodating housing 7 so that the projection panel assembly 1 and the protective cover 2 move to an adequate position. In addition, in the embodiment of the instant disclosure, the driving wheel 62 may indirectly drive the switching means 4 by a rotating wheel 63 arranged corresponding to the driving wheel 62 and interlinked with the switching means 4. Therefore, the rotating wheel 63 and the first driving unit 41 are arranged on a first pivotal axis L1 and rotate around a first axis C1 of the pivotally-rotating unit 43 (please refer to FIG. 4). It is worthwhile to mention that the specific structure of the transmission means 3 and the switching means 4 will be described later.

The first casing 73 has a guiding groove 72, the protective cover 2 has a guiding pin 22 corresponding to the guiding groove 72, the guiding pin 22 is arranged in the guiding groove 72, and the guiding pin 22 moves back and forth in the guiding groove 72 for moving the protective cover 2 between a closed position and an open position. When the protective cover 2 is positioned at the closed position, it shields the projection panel assembly 1 in the receiving space S, and when the protective cover 2 is positioned at the open position, it exposes a projection panel body 11 of the projection panel assembly 1.

To be specific, the closed position is where the protective cover 2 is above the opening 71 of the accommodating housing 7 and shields the opening 71 to prevent dust or filth entering the accommodating housing 7. In addition, the open position is where the protective cover 2 is far away from the opening 71 of the accommodating housing 7, and the protective cover 2 slides into the receiving space S by the guidance of the guiding groove 72. Preferably, the guiding grooves 72 are arranged on the two opposite sides of the opening 71 to correspond to the guiding pins 22 arranged on the two opposite sides of the protective cover 2 respectively.

Figure 6:
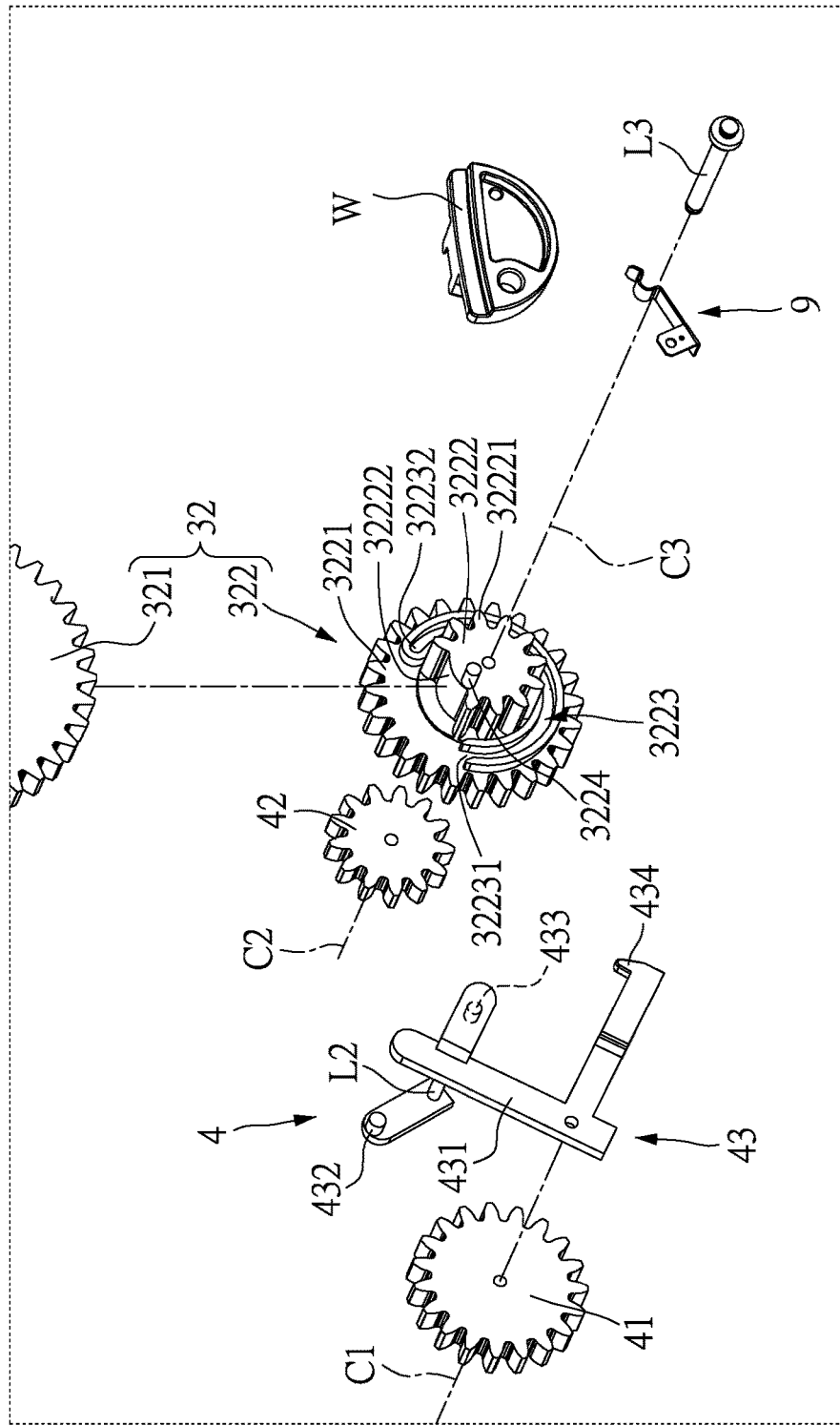
FIG. 6 is the partial enlargement view of part A in FIG. 4.

Next, please refer to FIG. 4 to FIG. 8. FIG. 6 is the partial enlargement view of part A in FIG. 4. For the sake of brevity, FIG. 4, FIG. 5, FIG. 7 and FIG. 8 only show the projection panel assembly 1, the protective cover 2, the transmission means 3, the switching means 4, the first pivotal axis L1, the second pivotal axis L2, and the third pivotal axis L3. To be specific, the transmission means 3 comprises a first transmission unit 31 arranged on the protective cover 2 and a second transmission unit 32 connected to the projection panel body 11, in which the second transmission unit 32 comprises a first transmission member 321 and a second transmission member 322. The projection panel assembly 1 comprises the projection panel body 11 and a supporting carrier 12. For instance, the projection panel body 11 and the first transmission member 321 of the second transmission unit 32 are arranged on the supporting carrier 12 and connected with each other. In addition, the supporting carrier 12 is rotated relative to the base 5 by a supporting frame W arranged between the base 5 and the supporting carrier 12.

In the embodiment of the instant disclosure, the first transmission member 321 of the second transmission unit 32 is a one-piece element. However, the instant disclosure is not limited thereto. In addition, the projection panel body 11 is preferably a curved plate and is fixed on the supporting carrier 12. Therefore, the projection panel body 11 may be moved by the second transmission unit 32 arranged on the supporting carrier 12. In other words, the projection panel assembly 1 is moved between a storage position and a display position by the second transmission unit 32 of the transmission means 3 which is driven by the switching means 4.

The protective cover 2 moves between the closed position and the open position and shields or exposes the projection panel body 11. The protective cover 2 comprises a protective cover guiding rail 21, the first transmission unit 31 arranged on the protective cover 2 is a rack structure and the first transmission unit 31 gears with the switching means 4 to receive the driving force of the switching means 4.

Figure 7:
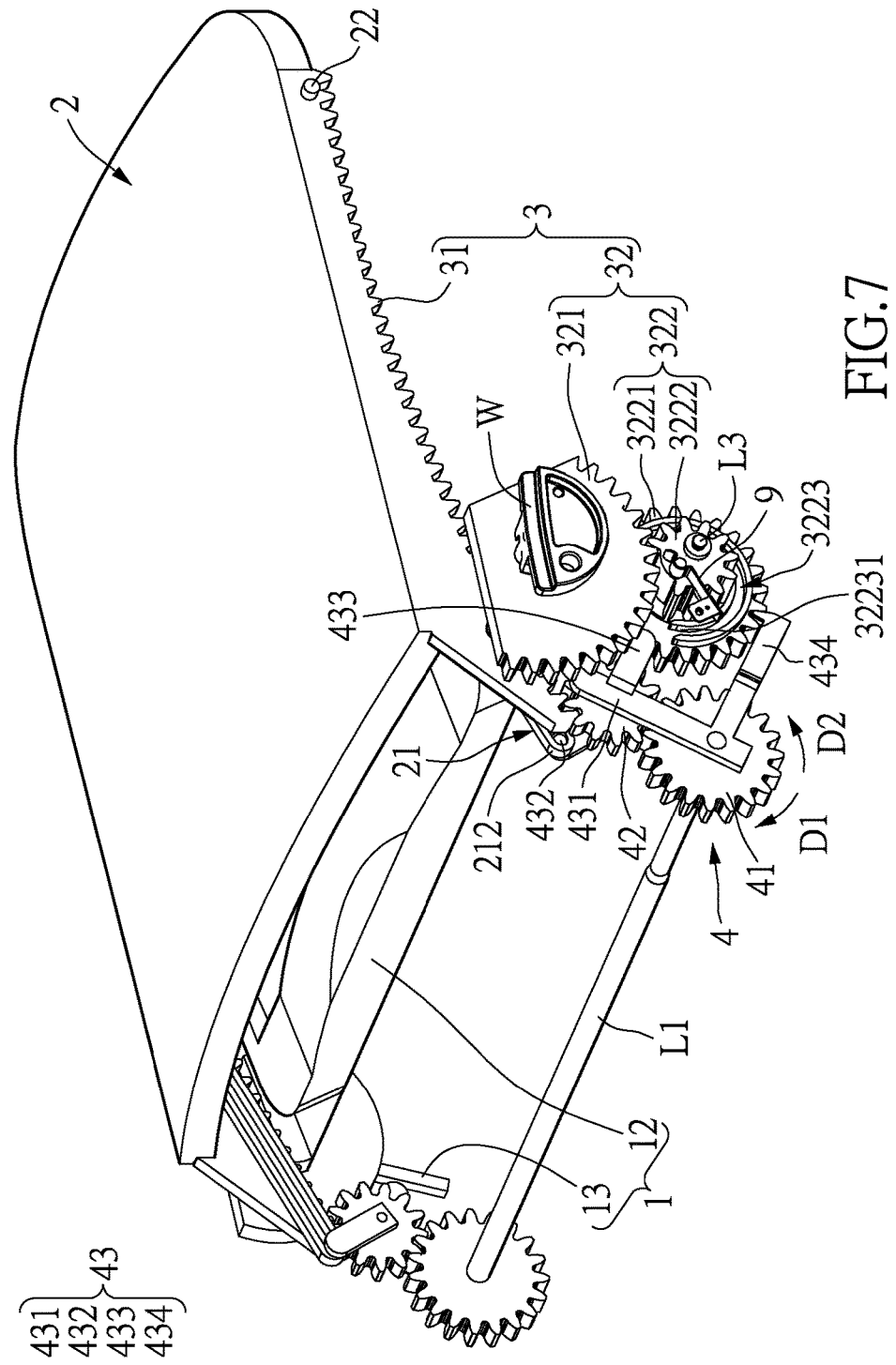
FIG. 7 to FIG. 19 are the schematic views of the head-up display device of the instant disclosure under different status and viewpoints.
Figure 8:
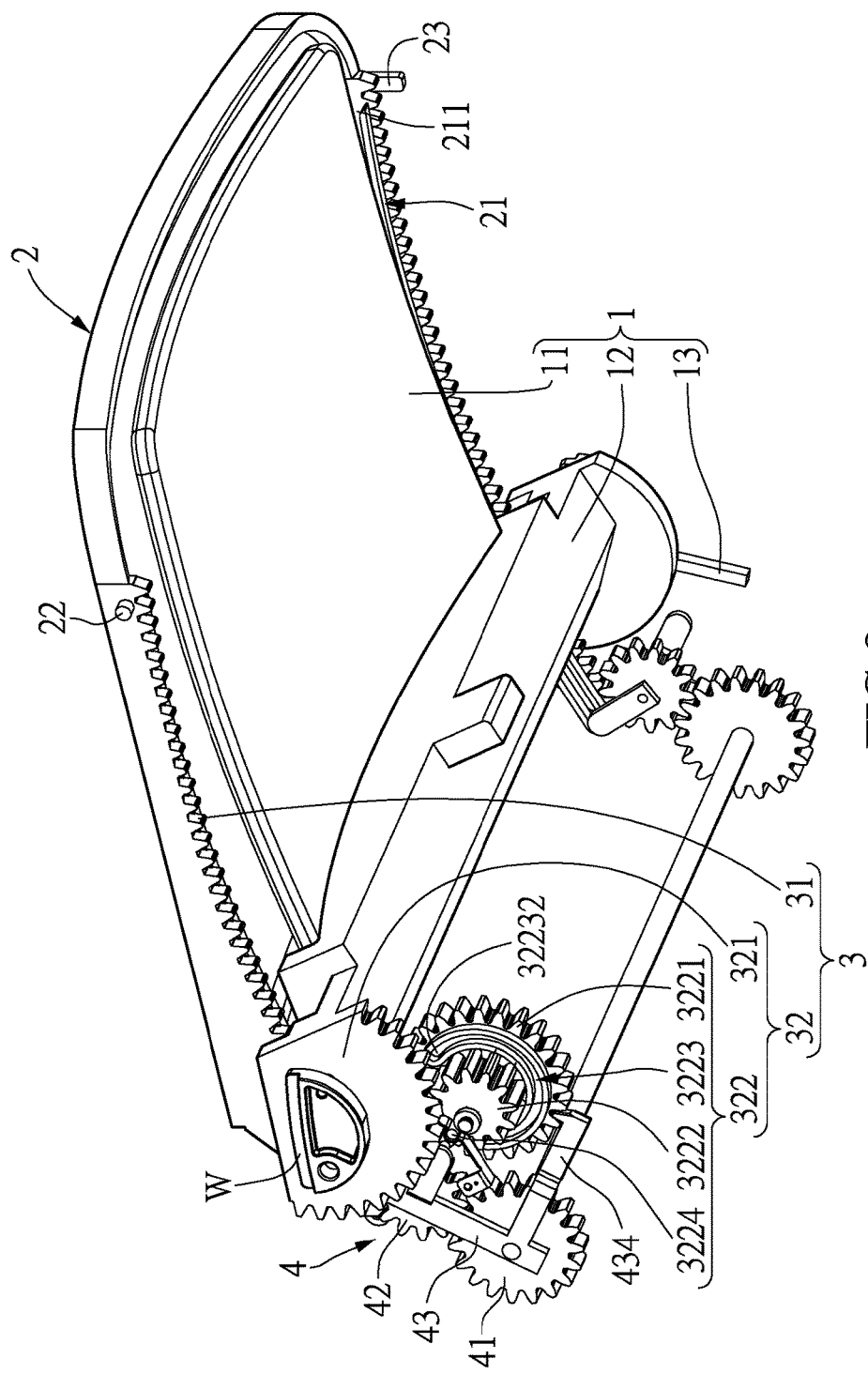
Figure 9:
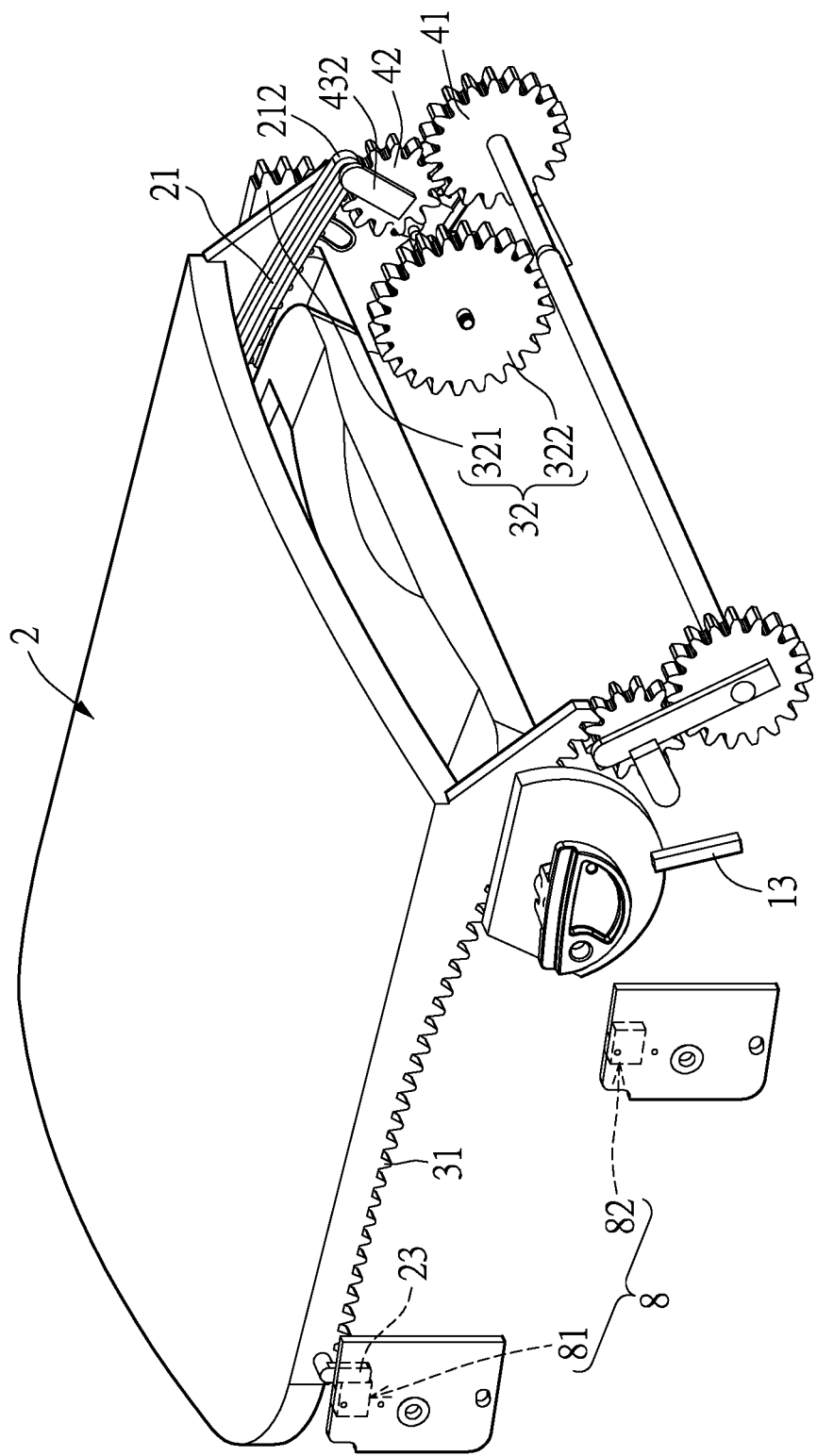
Figure 10:
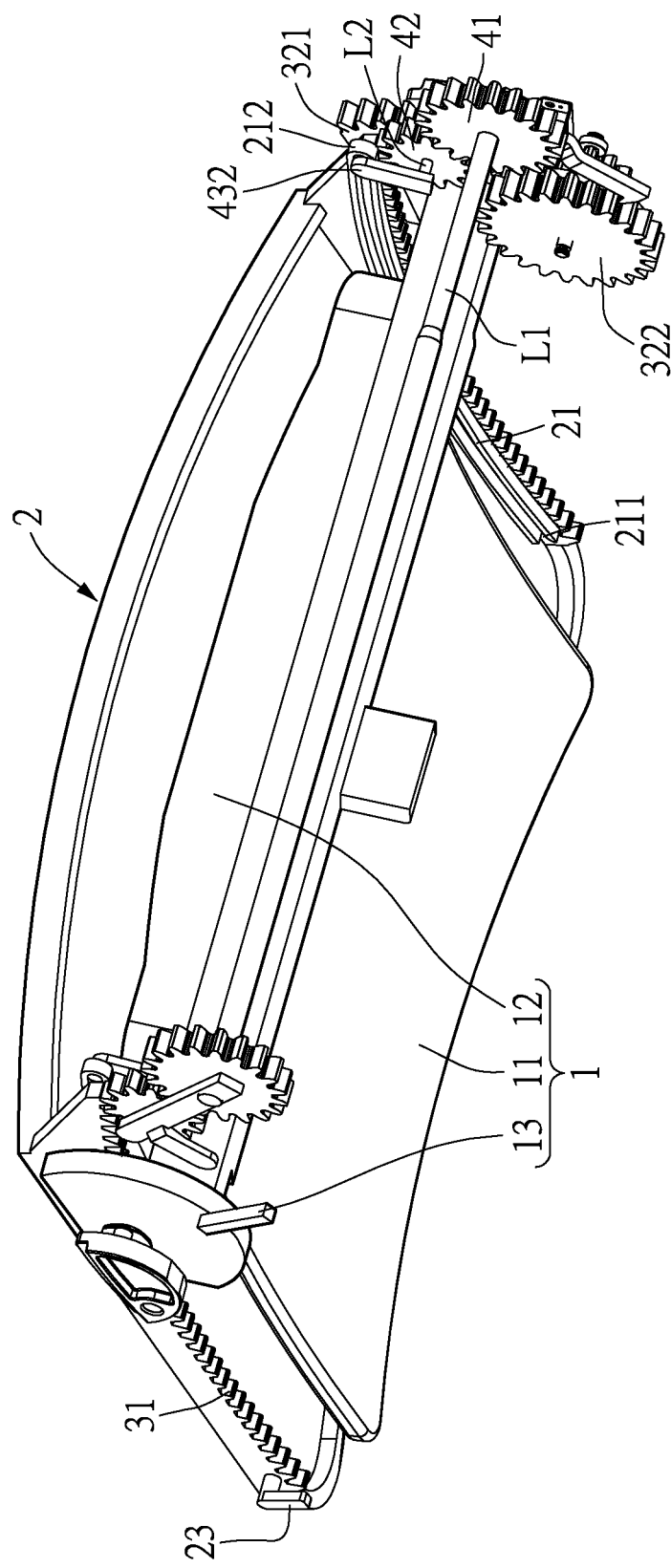

Next, please refer to FIG. 9 and FIG. 10, and refer to FIG. 6 to FIG. 8 as needed. FIG. 7 to FIG. 10 are the schematic views under different viewpoints in which the protective cover 2 is positioned at the closed position, the projection panel assembly 1 is positioned at the storage position and a second driving unit 42 is positioned at a first position. To be specific, the switching means 4 comprises a first driving unit 41, the second driving unit 42 driven by the first driving unit 41 and a pivotally-rotating unit 43. In the embodiments of the instant disclosure, all of the first driving unit 41, the second driving unit 42, the first transmission unit 31 and the second transmission unit 32 are gear structures and are interlinked with each other by the engagement therebetween. It is worthwhile to mention that for convenience of description, the following description only includes the content related to the transmission means 3 and switching means 4 on the same side which work with each other. However, in another embodiment, the switching means 4 may be arranged correspondingly at the two opposite sides of the protective cover 2 and projection panel assembly 1 for applying a stable force to move the protective cover 2 and projection panel assembly 1.

The pivotally-rotating unit 43 comprises a radial lever 431 arranged between the first driving unit 41 and the second driving unit 42 and a second pivotal axis L2. The radial lever 431 defines a first axis C1 and a second axis C2 positioned on the second pivotal axis L2 (the second axis C2 is also positioned on the second driving unit 42). The first driving unit 41 pivotally rotates around the first axis C1 and the second driving unit 42 pivotally rotates around the second axis C2. Since the first driving unit 41 and the second driving unit 42 are pivotally rotated around the first axis C1 and the second axis C2 respectively and are geared with each other, the radial lever 431 acts as a supporting arm fixing the distance between the first driving unit 41 and the second driving unit 42. In other words, the first driving unit 41, the second driving unit 42 and the radial lever 431 form an epicyclic gears system, the second driving unit 42 is driven by the radial lever 431 and epicycly rotates around the first driving unit 41. Therefore, the second driving unit 42 is driven by the first driving unit 41 and the pivotally-rotating unit 43 to move between the first position and a second position for switching between driving the protective cover 2 and driving the projection panel assembly 1.

In addition, when the second driving unit 42 is positioned at the first position, the second driving unit 42 drives the first transmission unit 31 in order to drive the protective cover 2 to move between the closed position and the open position. When the second driving unit 42 is positioned at the second position, the second driving unit 42 drives the second transmission unit 32 in order to drive the projection panel assembly 1 to move between the storage position and the display position. The operation for switching between the first position and the second position will be described later.

The pivotally-rotating unit 43 further comprises a first guiding member 432 connected to the radial lever 431, and the first guiding member 432 is arranged in the protective cover guiding rail 21 of the protective cover 2. When the second driving unit 42 drives the second transmission unit 32 of the protective cover 2, the protective cover guiding rail 21 of the protective cover 2 may be driven to slide along the first guiding member 432 and the protective cover 2 may be moved between the closed position and the open position. To be specific, the protective cover guiding rails 21 are arranged at the two opposite sides of the protective cover 2 and each has an open end 211 and a termination end 212 opposite to the open end 211. When the second driving unit 42 is positioned at the first position at which the second driving unit 42 is geared with the first transmission unit 31, the first guiding member 432 is adjacent to or positioned at the termination end 212 of the protective cover guiding rail 21, and the protective cover 2 is positioned at the closed position. In addition, the first guiding member 432 leaves or slides off the protective cover guiding rail 21 through the open end 211 and moves from the first position towards the second position. Therefore, the second driving unit 42 of the switching means 4 is moved from the first position for driving the first transmission unit 31 to the second position for driving the second transmission unit 32.

Figure 11:
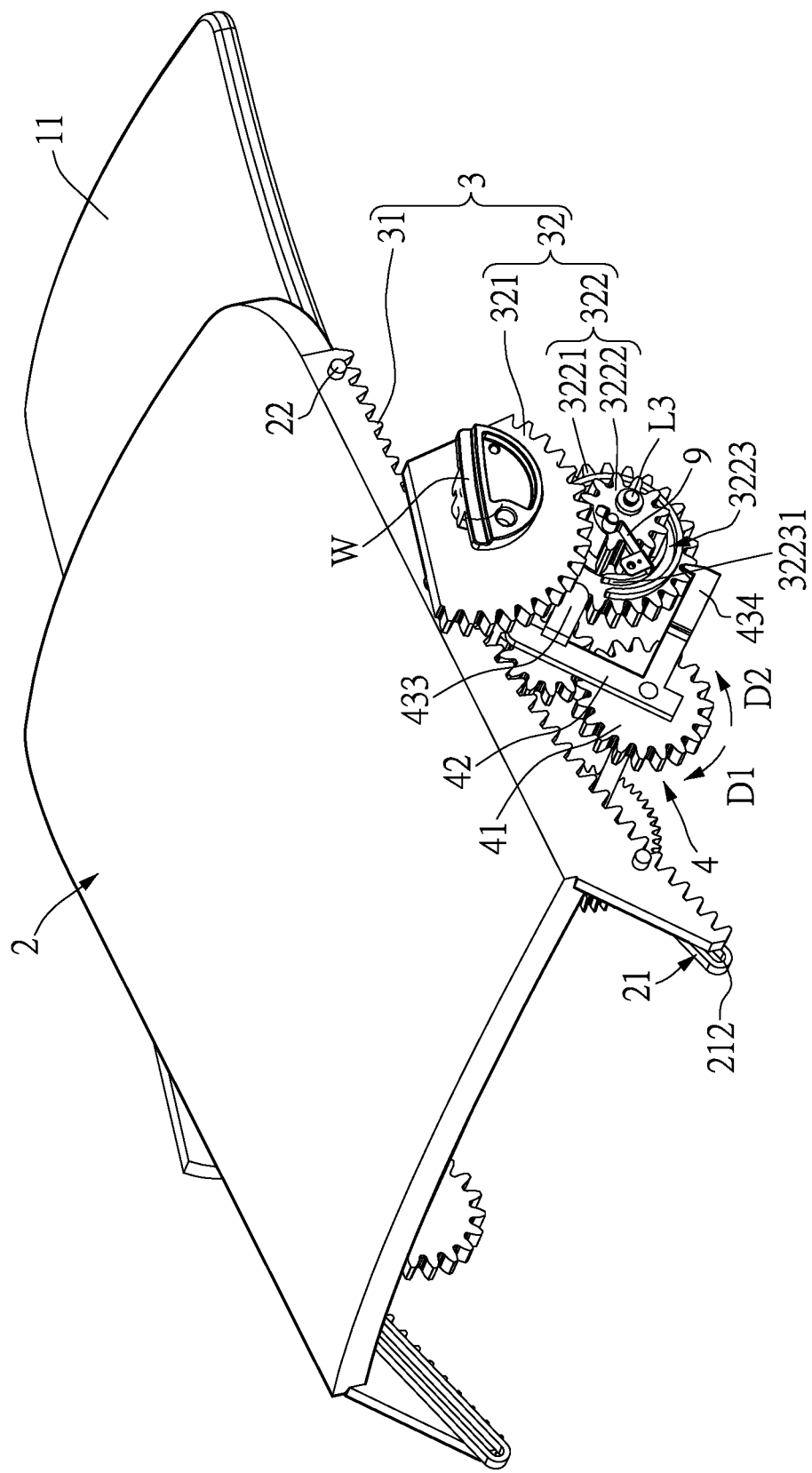
Figure 12:
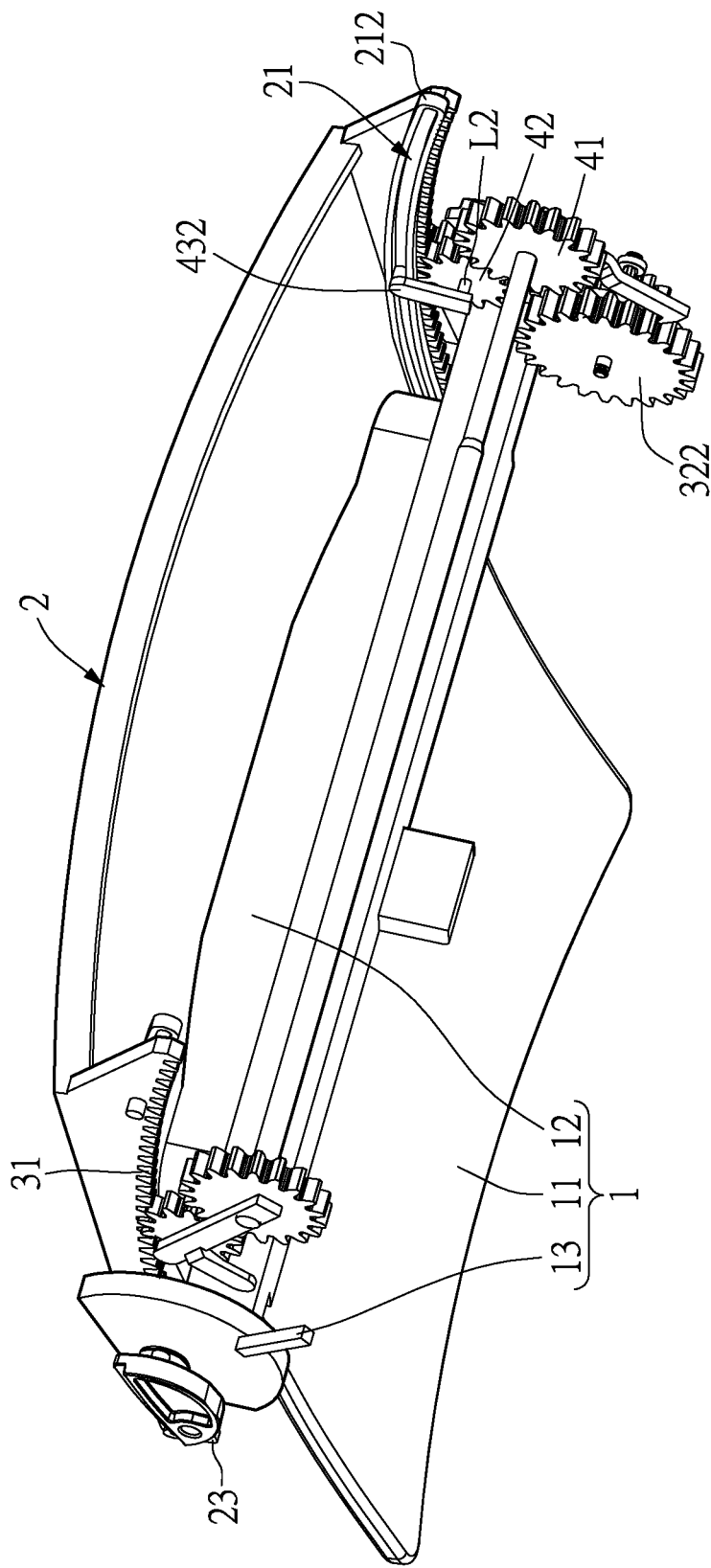

Next, please refer to FIG. 11 and FIG. 12 and refer to FIG. 7 to FIG. 10 as needed. In FIG. 11 and FIG. 12, the protective cover 2 is positioned between the closed position and the open position, the projection panel assembly 1 is still positioned at the storage position, and the second driving unit 42 is positioned at the first position. The procedure for moving the second driving unit 42 from the first position to the second position is described as follows. To be specific, when the second driving unit 42 is positioned at the first position and the first driving unit 41 rotates toward a first predetermined direction D1 (the clockwise direction as shown in FIG. 7), the first driving unit 41 drives the second driving unit 42 and causes the second driving unit 42 to drive the first transmission unit 31 arranged on the protective cover 2. Therefore, the protective cover 2 slides toward the direction far from the opening 71 and the first guiding member 432 moves to a position between the open end 211 and the termination end 212 of the protective cover guiding rail 21.

Figure 13:
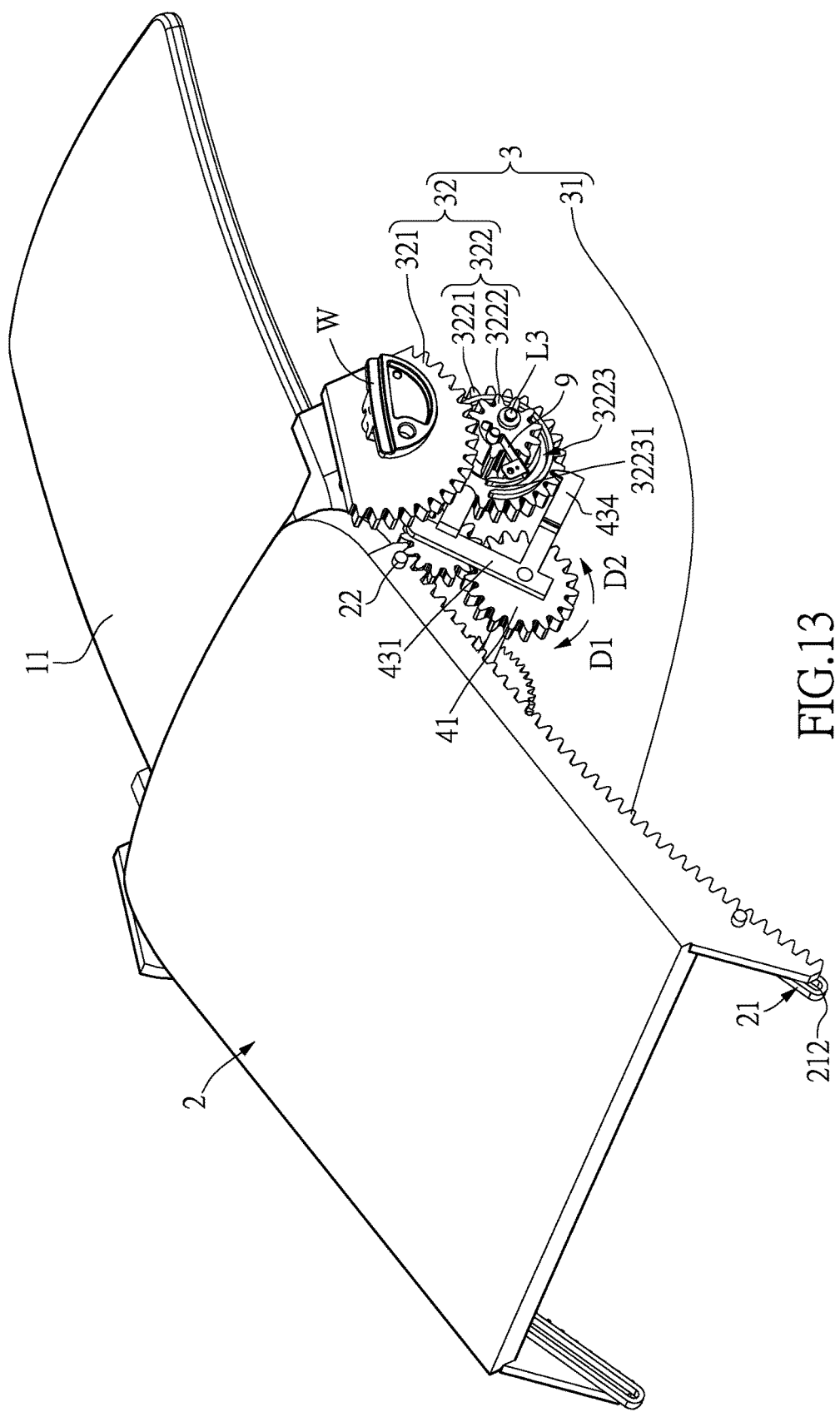
Figure 14:
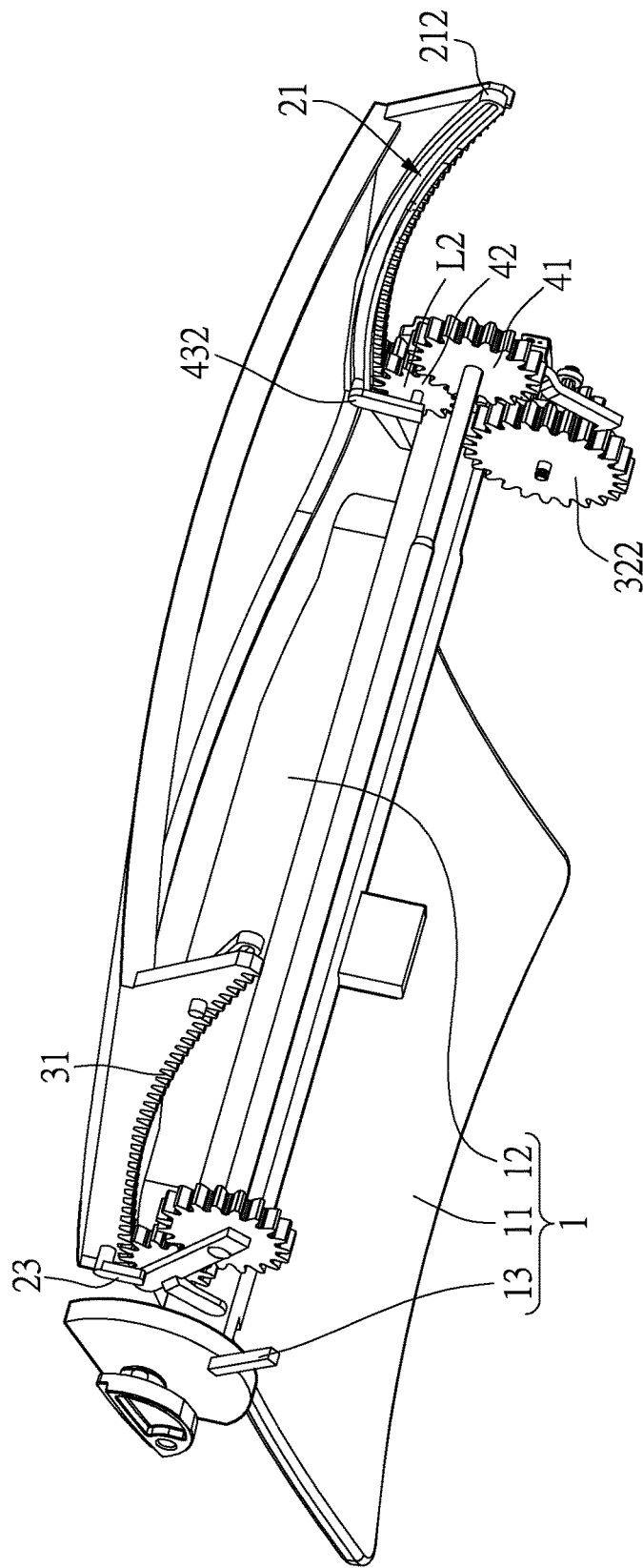

Please refer to FIG. 13 and FIG. 14, and refer to FIG. 11 and FIG. 12 as needed. In FIG. 13 and FIG. 14, the protective cover 2 is positioned at the open position, the projection panel assembly 1 is still positioned at the storage position and the second driving unit 42 is positioned at the first position. When the first driving unit 41 continues to rotate toward the first predetermined direction D1, the protective cover 2 continues to move from the closed position to the open position and hence, the first guiding member 432 moves to the open end 211 of the protective cover guiding rail 21.

Figure 15:
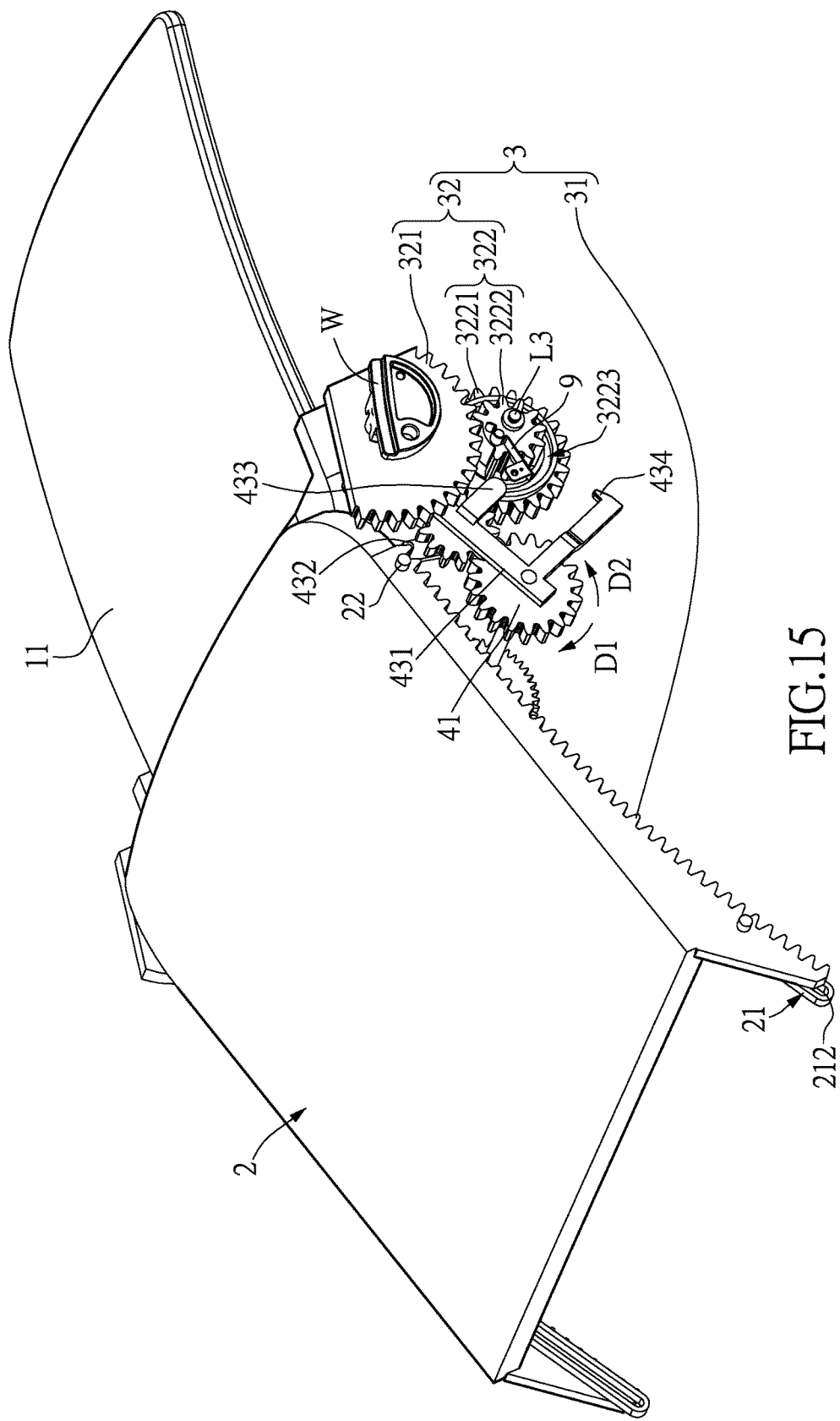
Figure 16:
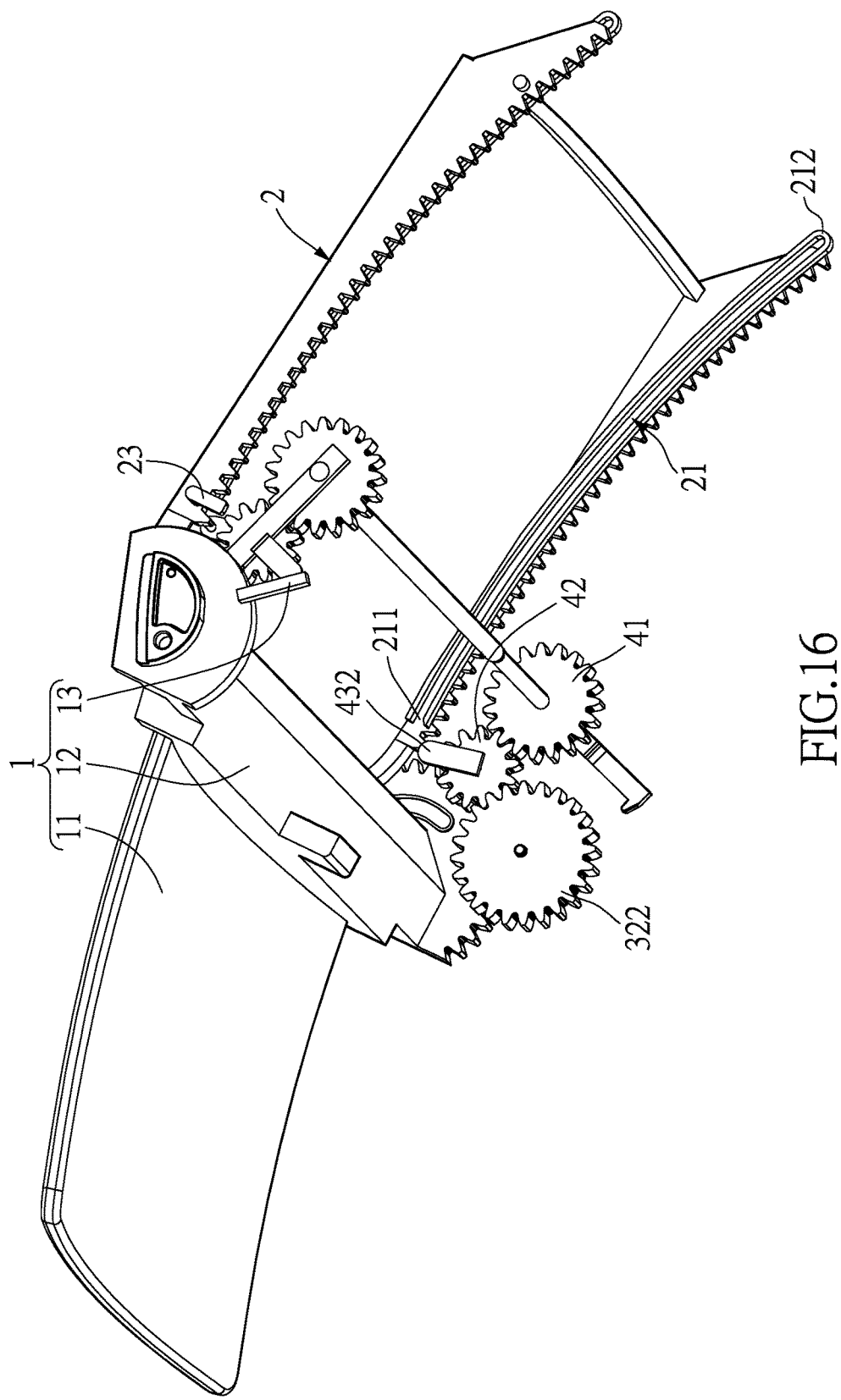

Next, please refer to FIG. 15, FIG. 16 and FIG. 6, and refer to FIG. 13 and FIG. 14 as needed. FIG. 15 and FIG. 16 show the status when the protective cover 2 is positioned at the open position, the projection panel assembly 1 is still positioned at the storage position and the second driving unit 42 is positioned at the second position. Based on the epicyclic gear system formed by the first driving unit 41, the second driving unit 42 and the pivotally-rotating unit 43, the second driving unit 42 will be driven by the radial lever 431 and epicyclically rotates around the first driving unit 41. However, since the first guiding member 432 connected to the radial lever 431 is limited in the protective cover guiding rail 21, the second driving unit 42 will continue to remain at a position at which it is geared with the first transmission unit 31 until the first guiding member 432 detaches from the open end 211 of the protective cover guiding rail 21. At this time, the second driving unit 42 is driven to the second position at which it is geared with the second transmission unit 32.

The second driving unit 42 moves toward the second position with the first axis C1 as axis center and the vertical distance between the first axis C1 and the second axis C2 as a radius, for gearing with the second transmission unit 32. For instance, the second transmission unit 32 comprises a first transmission member 321 connected to the projection panel body 11 and a second transmission member 322 connected between the first transmission member 321 and the second driving unit 42. The second driving unit 42 indirectly drives the first transmission member 321 arranged on the supporting carrier 12 through the second transmission member 322, thereby driving the projection panel assembly 1 to move between the storage position and the display position. However, it is worthwhile to mention that although the second driving unit 42 indirectly drives the first transmission member 321 through the second transmission member 322 in the present embodiment, in other embodiments, the second driving unit 42 may directly drive the first transmission member 321 thereby driving the projection panel assembly 1, or the projection panel assembly 1 may be driven by more gear sets. The instant disclosure is not limited thereto. In addition, the base 5 defines a third axis C3 which is generated by a third pivotal axis L3 arranged on the base 5, and the second transmission member 322 pivotally rotates in the base 5 by the third pivotal axis L3. However, the instant disclosure is not limited thereto.

In the embodiment of the instant disclosure, the pivotally-rotating unit 43 further comprises a second guiding member 433 connected to the radial lever 431. The radial lever 431, and the first guiding member 432 and the second guiding member 433 are a one-piece component and hence, the first guiding member 432 and the second guiding member 433 will move with the radial lever 431. The second transmission member 322 comprises a sliding rail 3223, and the sliding rail 3223 has an opening end 32231 and a closing end 32232 opposite to the opening end 32231.

When the second driving unit 42 moves toward the second position, the second guiding member 433 moves to the opening end 32231 of the sliding rail 3223 and enters the sliding rail 3223 through the opening end 32231. The second driving unit 42 gears with the second transmission member 322 and drives the first transmission member 321 and hence, the sliding rail 3223 slides along the second guiding member 433 for moving the projection panel assembly 1 between the storage position and the display position.

Please refer to FIG. 6. Preferably, the second transmission member 322 further comprises a first transmission part 3221 and a second transmission part 3222 interlinked with the first transmission part 3221. The sliding rail 3223 is arranged on the first transmission part 3221, in which when the second driving unit 42 is positioned at the second position, the second driving unit 42 drives the first transmission part 3221, the first transmission part 3221 drives the second transmission part 3222, and then the second transmission part 3222 drives the first transmission member 321. In the embodiments of the instant disclosure, in order to drive the projection panel assembly 1 easily, the second transmission part 3222 comprises an operation area 32221 and a buffer area 32222 connected to the operation area 32221. When the second guiding member 433 is positioned at the opening end 32231, the second transmission part 3222 is not interlinked with the first transmission member 321; when the second guiding member 433 enters the sliding rail 3223 and is away from the opening end 32231 for a predetermined distance, the operation area 32221 of the second transmission part 3222 starts to interact with the first transmission member 321. In other words, when the second guiding member 433 is positioned at the opening end 32231, the first transmission member 321 is above the buffer area 32222 and since the buffer area 32222 is a gearless area, the second driving unit 42 first drives the second transmission member 322 and after the second transmission member 322 rotates for a predetermined angle, the operation area 32221 on the second transmission part 3222 gears with the first transmission member 321.

For ensuring that the second guiding member 433 slides into the opening end 32231 when the second driving unit 42 moves to the second position, the pivotally-rotating unit 43 further comprises a fixing member 434 connected to the radial lever 431 for limiting the position of the second transmission member 322. When the second driving unit 42 is positioned at the first position, the fixing member 434 will be positioned at a fixing position for limiting the position for rotating the second transmission member 322, i.e., ensuring the opening end 32231 is positioned in the range where the second guiding member 433 swings. Therefore, when the second driving unit 42 moves from the first position toward the second position, the fixing member 434 swings with the radial lever 431 and moves from the fixing position toward a detached position for releasing the second transmission member 322.

Figure 17:
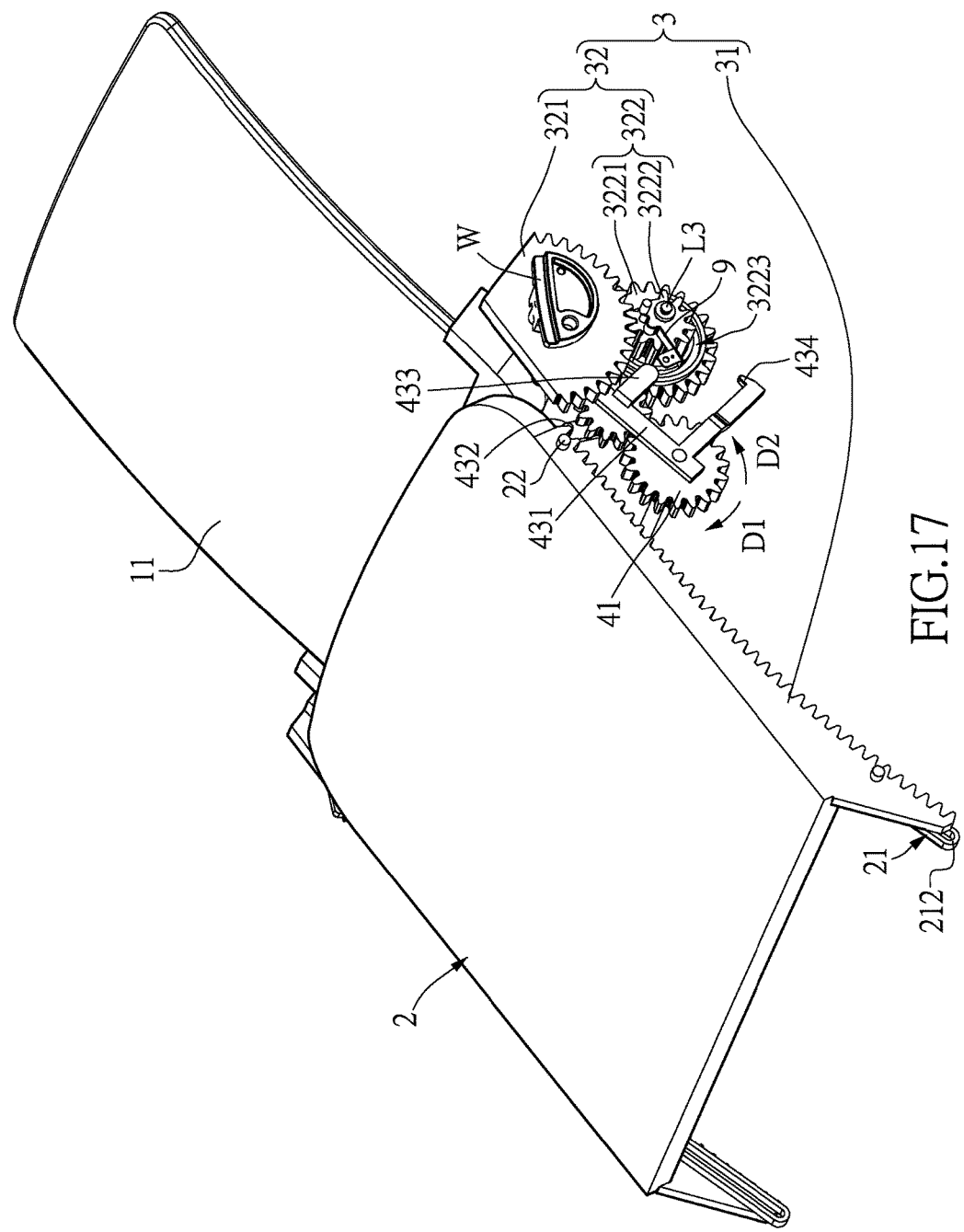

Please refer to FIG. 17 and FIG. 6 and refer to FIG. 15 and FIG. 16 as needed. FIG. 17 shows the status in which the protective cover 2 is positioned at the open position, the projection panel assembly 1 is positioned between the storage position and the display position, and the second driving unit 42 is positioned at the second position. Preferably, the sliding rail 3223 may be a curved rail having a center on the third axis C3 and the radius thereof is less than the radius of the second transmission member 322.

Figure 18:
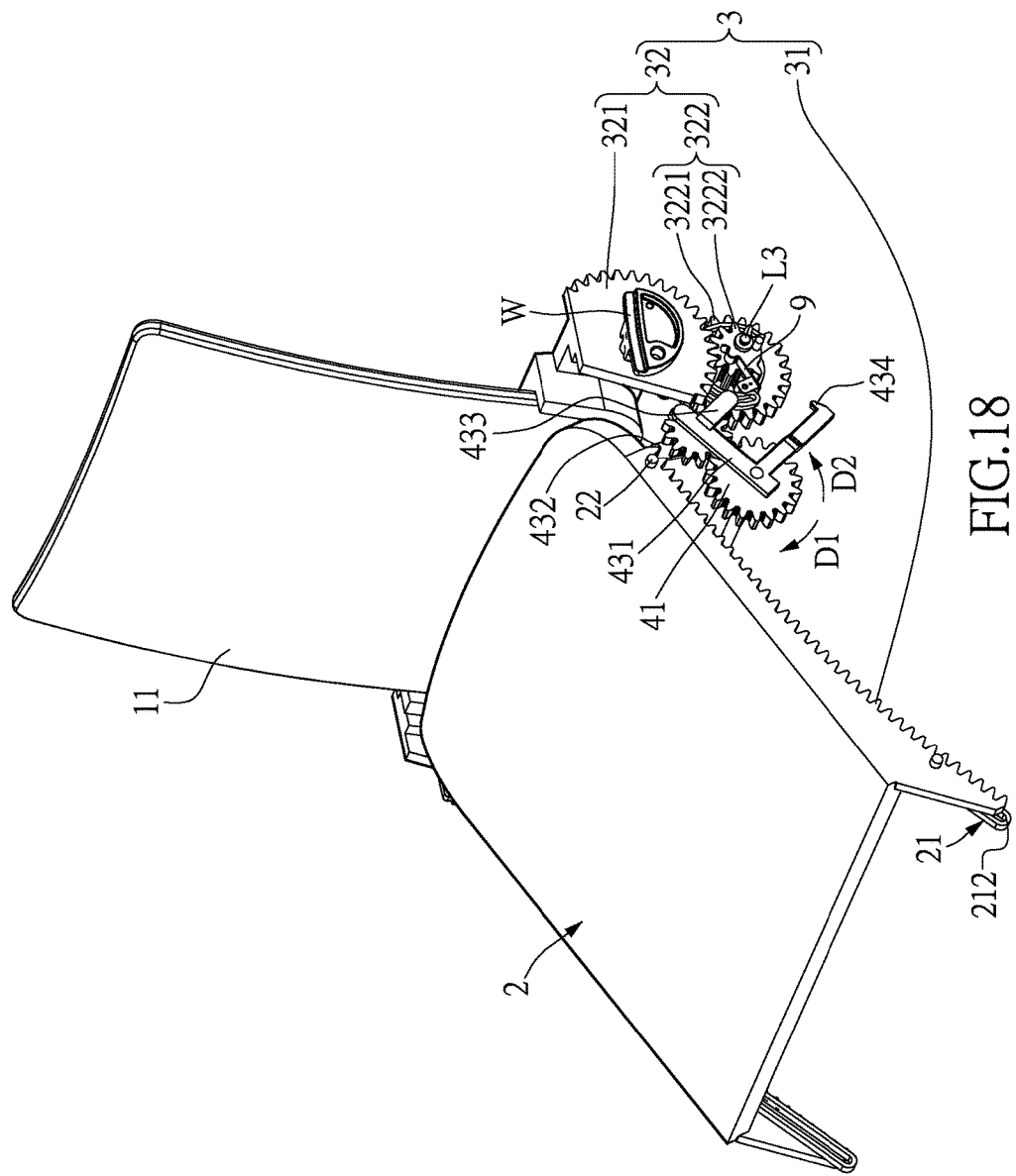
Figure 19:
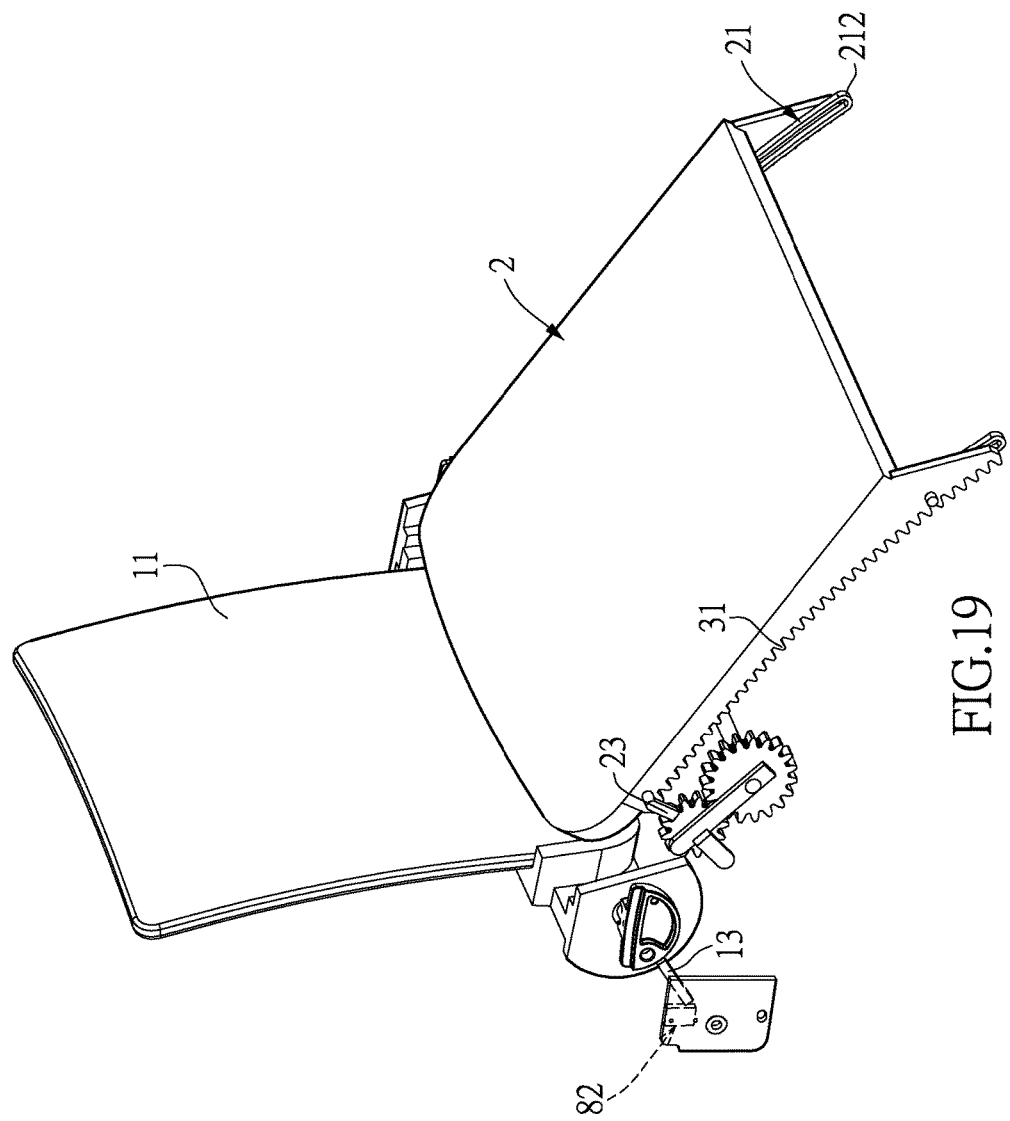

Please refer to FIG. 18, FIG. 19 and FIG. 6, and refer to FIG. 17 as needed. FIG. 18 and FIG. 19 show the status in which the protective cover 2 is positioned at the open position, the projection panel assembly 1 is positioned at the display position, and the second driving unit 42 is positioned on the second position. As shown in FIG. 15 to FIG. 19, when the second driving unit 42 is positioned at the second position and the first driving unit 41 continues to rotate toward the first predetermined direction D1, the second guiding member 433 moves to the opening end 32231 of the sliding rail 3223 and the first driving unit 41 drives the second driving unit 42, thereby causing the second guiding member 433 to move into the sliding rail 3223. The second driving unit 42 drives the second transmission member 322, thereby causing the second transmission member 322 to drive the first transmission unit 31 of the projection panel assembly 1 for moving the projection panel assembly 1 from the storage position to the display position.

Preferably, as shown in FIG. 19 and FIG. 9, the head-up display device H further comprises a position detecting unit 8. Taking FIG. 19 as an example, the head-up display device H further comprises a projection panel position detecting unit 82 arranged in the accommodating housing 7 for judging if the projection panel assembly 1 is positioned at the display position. The projection panel assembly 1 further comprises a projection panel position informing unit 13 which is a rod or a pin for abutting or pressing the projection panel position detecting unit 82 when the projection panel assembly 1 is moved to the display position. However, the instant disclosure is not limited thereto. In other embodiments, the projection panel position detecting unit 82 and the projection panel position informing unit 13 may be a Hall Effect sensor switch.

Please refer to FIG. 19. When the first driving unit 41 rotates toward a direction opposite to the first predetermined direction D1 (counterclockwise as shown in FIG. 7), the second guiding member 433 moves from the closing end 32232 of the sliding rail 3223 to the open end 211. After the second driving unit 42 leaves the open end 211, the second driving unit 42 may move from the second position to the first position and cause the first guiding member 432 to move to the open end 211 of the protective cover guiding rail 21 and to slide from the open end 211 to the protective cover guiding rail 21 for moving the protective cover 2 from the open position to the closed position.

Taking FIG. 9 as an example, the head-up display device H further comprises a protective cover position detecting unit 81 arranged in the accommodating housing 7 for judging if the protective cover 2 is positioned at the closed position. The protective cover 2 further comprises a protective cover position informing unit 23 arranged at a side of the protective cover 2, and the protective cover position informing unit 23 may be a rod or a pin for abutting or pressing the protective cover position detecting unit 81 when the protective cover 2 is moved to the closed position. However, the instant disclosure is not limited thereto. In other words, in other embodiments, the protective cover position detecting unit 81 and the protective cover position informing unit 23 may be a Hall Effect sensor switch.

Please refer to FIG. 6. The second transmission unit 32 further comprises a stopper portion 3224 arranged on the second transmission member 322, and the head-up display device H further comprises a position limiting unit 9 cooperated with the stopper portion 3224. The position limiting unit 9 is arranged on the base 5 for abutting the stopper portion 3224 when the projection panel assembly 1 is positioned at a storage position for limiting the position of the second transmission member 322. In other words, when the projection panel assembly 1 is positioned at the storage position, the position limiting unit 9 abuts the stopper portion 3224 substituting for the function of the fixing member 434. However, in other embodiments, the position of the second transmission member 322 may be limited by an elastic element (not shown) such as a spring arranged on the third pivotal axis L3.

In sum, the advantages of the instant disclosure reside in that the head-up display device H involves driving the first transmission unit 31 thereby driving the protective cover 2 to move relative to the accommodating housing 7 by the switching means 4, or driving the second transmission unit 32 thereby driving the projection panel assembly 1 to move relative to the accommodating housing 7 by the switching means 4. Therefore, there is no need to employ a set of driving means only for driving the projection panel assembly 1. The protective cover 2 and the projection panel assembly 1 may be driven by the driving means 6, i.e., the protective cover 2 is moved by driving the second driving unit 42 interlinked with the first driving unit 41 at the first position or the projection panel assembly 1 is moved by driving the second driving unit 42 interlinked with the first driving unit 41 at the second position. Therefore, the structure complexity and the manufacturing cost of the head-up display device H may be reduced.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A head-up display device, comprising:
   a projection panel assembly;
   a protective cover shielding or exposing the projection panel assembly;
   a transmission means comprising a first transmission unit arranged on the protective cover and a second transmission unit connected to the projection panel assembly; and
   a switching means comprising a first driving unit, a second driving unit and a pivotally-rotating unit, wherein the second driving unit is driven by the first driving unit and the pivotally-rotating unit to move between a first position and a second position;
   wherein when the second driving unit is positioned at the first position, the second driving unit drives the first transmission unit, and the first transmission unit drives the protective cover to move between a closed position and an open position;
   wherein when the second driving unit is positioned at the second position, the second driving unit drives the second transmission unit, and the second transmission unit drives the projection panel assembly to move between a storage position and a display position.

2. The head-up display device according to claim 1, wherein the second transmission unit comprises a first transmission member connected to the projection panel assembly and a second transmission member connected between the first transmission member and the second driving unit, wherein the second driving unit drives the first transmission member through the second transmission member and the first transmission member drives the projection panel assembly to move between the storage position and the display position.

3. The head-up display device according to claim 2, wherein the pivotally-rotating unit comprises a radial lever arranged between the first driving unit and the second driving unit and a first guiding member connected to the radial lever, wherein the protective cover comprises a protective cover guiding rail, the first guiding member is arranged in the protective cover guiding rail, when the second driving unit is positioned at the first position, the second driving unit drives the first transmission unit and the first transmission unit drives the protective cover guiding rail to slide along the first guiding member for moving the protective cover between the closed position and the open position.

4. The head-up display device according to claim 3, wherein the pivotally-rotating unit further comprises a fixing member connected to the radial lever for limiting the second transmission member, wherein when the second driving unit moves from the first position toward the second position, the fixing member swings with the radial lever and moves from a fixed position to a detached position.

5. The head-up display device according to claim 3, wherein the protective cover guiding rail has an open end, when the first guiding member leaves the protective cover guiding rail through the open end, the second driving unit moves from the first position towards the second position.

6. The head-up display device according to claim 3, wherein the pivotally-rotating unit further comprises a second guiding member connected to the radial lever and the second transmission member comprises a sliding rail having has an opening end, wherein when the second driving unit is positioned at the second position, the second guiding member enters the sliding rail through the opening end, and the second driving unit drives the second transmission member, the second transmission member drives the first transmission member for causing the sliding rail sliding along the second guiding member.

7. The head-up display device according to claim 6, wherein when the second driving unit is positioned at the first position and the first driving unit rotates toward a first predetermined direction, the first driving unit drives the second driving unit, the second driving unit drives the protective cover to move from the closed position to the open position, and the first guiding member leaves the protective cover guiding rail through an open end of the protective cover guiding rail, and moves the second guiding member to the open end of the sliding rail from the first position toward the second position using a first axis the center and the distance between the first axis and a second axis as a radius, wherein when the second driving unit is positioned at the second position and the first driving unit continuously rotates toward the first predetermined direction, the first driving unit drives the second driving unit for moving the second guiding member into the sliding rail, the second driving unit drives the second transmission member, and the second transmission member drives the first transmission member connected to the projection panel assembly for moving the projection panel assembly from the storage position to the display position, wherein the first driving unit pivotally rotates around the first axis, and the second driving unit pivotally rotates around the second axis.

8. The head-up display device according to claim 6, wherein the second transmission member further comprises a first transmission part and a second transmission part interlinked with the first transmission part, the sliding rail is arranged on the first transmission part, wherein when the second driving unit is positioned at the second position, the second driving unit drives the first transmission part to drive the second transmission part, and the second transmission part drives the first transmission member.

9. The head-up display device according to claim 8, wherein the second transmission part comprises an operation area, when the second guiding member is positioned at the opening end, the second transmission member is not interlinked with the first transmission member, when the second guiding member enters the sliding rail and is separated from the opening end for a predetermined distance, the operation area of the second transmission part interacts with the first transmission member.

10. The head-up display device according to claim 1, wherein the projection panel assembly further comprises a supporting carrier and a projection panel body, the projection panel body and the second transmission unit are positioned on the supporting carrier.

11. The head-up display device according to claim 1, further comprising: a base, a driving means arranged on the base, wherein the second transmission member is arranged on the base and the base defines a third axis, the second transmission member pivotally rotates around the third axis, wherein the driving means is connected to the first driving unit for driving the first driving unit.

12. The head-up display device according to claim 1, further comprising: an accommodating housing having an accommodating space and an opening connected to the accommodating space, wherein the projection panel assembly, the transmission means and the switching means are arranged in the accommodating space, wherein the closed position is positioned at the opening, the open position is far from the opening, wherein the storage position is beneath the opening and in the accommodating space, and the display position is outside of the accommodating housing.

13. The head-up display device according to claim 12, wherein the accommodating housing further comprises a guiding groove, the protective cover further comprises a guiding pin, the guiding pin is arranged in the guiding groove and the guiding pin slides in the guiding groove.

14. The head-up display device according to claim 12, further comprising: a protective cover position detecting unit for judging if the protective cover is positioned at the closed position and a projection panel position detecting unit for judging if the projection panel assembly is positioned at the display position, wherein the protective cover position detecting unit and the projection panel position unit are arranged in the accommodating housing.

15. The head-up display device according to claim 1, further comprising: a position limiting unit, the second transmission unit further comprises a stopper portion cooperated with the position limiting unit, wherein when the projection panel assembly is positioned at the storage position, the position limiting unit abuts the stopper portion.

16. The head-up display device according to claim 1, wherein the transmission means and the switching means are gear components.

* * * * *